United States Patent [19]

Glucksman

[11] Patent Number: 5,753,002
[45] Date of Patent: *May 19, 1998

[54] HIGH-EFFICIENCY AIR FILTER

[75] Inventor: Dov Glucksman, Wenham, Mass.

[73] Assignee: Appliance Development Corp., Danvers, Mass.

[*] Notice: The term of this patent shall not extend beyond the expiration date of Pat. No. 5,512,086.

[21] Appl. No.: 591,827

[22] Filed: Jan. 25, 1996

Related U.S. Application Data

[62] Division of Ser. No. 259,465, Jun. 14, 1994, Pat. No. 5,512,086.

[51] Int. Cl.$^6$ .................... B01D 46/52; B03C 3/00
[52] U.S. Cl. .................. 55/471; 55/472; 55/497; 55/500; 55/502
[58] Field of Search ............... 55/467, 471, 472, 55/473, 210, 213, 385.1, 385.2, 490, 502, 495, 497, DIG. 34, 500; 96/68; 95/273

[56] References Cited

U.S. PATENT DOCUMENTS

| | | | |
|---|---|---|---|
| 3,928,008 | 12/1975 | Petersen | 55/472 |
| 3,936,284 | 2/1976 | Mason | 55/472 |
| 4,265,643 | 5/1981 | Dawson | 55/473 |
| 4,629,482 | 12/1986 | Davis | 55/385.2 |
| 4,737,173 | 4/1988 | Kudirka et al. | 55/472 |
| 4,778,496 | 10/1988 | Conrad | 55/472 |
| 5,078,764 | 1/1992 | Lutterbach et al. | 55/467 |
| 5,102,435 | 4/1992 | Rau et al. | 55/467 |
| 5,131,932 | 7/1992 | Glucksman | 55/472 |
| 5,230,723 | 7/1993 | Travis et al. | 55/472 |
| 5,259,854 | 11/1993 | Newman | 55/472 |
| 5,290,330 | 3/1994 | Tepper et al. | 55/472 |
| 5,512,086 | 4/1996 | Glucksman | 96/68 |

Primary Examiner—Duane S. Smith
Attorney, Agent, or Firm—Sofer & Haroun, LLP

[57] ABSTRACT

A high-efficiency air filtering apparatus for cleaning and circulating air in a closed room is in the shape of a vertical cylinder and includes a semi-cylindrical housing and a semi-cylindrical filtering chamber, both enclosing a centrifugal blower configured to suck filtered air out of the apparatus through the filter and to blow it into the room. The apparatus is characterized by that the filtering chamber contains a closely pleated filter sheet of HEPA-filter which is covered on top and bottom by flat panels and is air-tightly pressed onto the semi-cylindrical housing, thus making the apparatus completely air tight. The filtering chamber is urged onto the contour of the filtering chamber and is releasably fastened to the top and bottom of the housing, permitting replacement of the filter after clogging. A pressure sensor is mounted on the blower housing configured to effect a visible signal to be issued as soon as the pressure inside the housing rises above a predesignated magnitude due to clogging of the filter.

7 Claims, 14 Drawing Sheets

HIGH-EFFICIENCY AIR FILTER

RELATED U.S. APPLICATION DATA

Divisional application of Ser. No. 08/259,465, filed Jun. 14, 1994 issued Apr. 30, 1996 as U.S. Pat. No. 5,512,086.

The invention relates to a portable room air cleaner of very high efficiency, particularly to an air cleaner configured to circulate air in a room and to pass it by blower means through a user replaceable filter known under the name HEPA-filter (High-efficiency particulate air filter).

BACKGROUND OF THE INVENTION

As the quality of indoor air becomes less predictable as far as air pollutants are concerned and as more and more respiratory diseases are caused by airborne particles of a smaller and smaller size the demand increases for domestic air cleaners that are capable of removing particles in the sub micron range at high removal efficiencies.

Filtration media capable of high filtration efficiencies for sub micron particles have been in wide use in "clean-room" applications and other hospital and industrial applications. Media classified as HEPA are characterized by their ability to filter up to 99.97% of all airborne particles of a size of 0.3 micron and larger.

The HEPA media comprises a dense non-woven sheet of glass fibres held together with an organic binder. Due to its dense structure it causes a high pressure-drop in the air passing through it. The high pressure difference between up stream and down stream on the filter will cause a significant amount of unfiltered air to flow through any gap or opening that might exist around the filter or within the air cleaner structure propper.

Since HEPA filters arrest up to 99.97% of all particles, even the smallest amount of unfiltered air mixing with the clean air will bring the filtering efficiency percentage down significantly.

It is for that reason that it is of paramount importance to insure during the design of high efficiency air cleaners that the sealing of the filter is optimized and that no unfiltered air is permitted to infiltrate into the air cleaner, and bypass the filter.

Owing to the high pressure drop caused by the media and owing to the fact that the filter will build up over time a layer of trapped dust and pollutants which will further increase the pressure drop, it is imperative to provide each air cleaner with a filter of a large through-flow area. This will reduce the face velocity and, accordingly, result in a reduced pressure drop. As an example:—at a face velocity of 10.5 feet per minute the pressure drop across a typical HEPA-filter is 1.25" W.G., while tripling the face or through-flow area the velocity will be reduced to 3.5 Ft/min and the pressure drop to about 0.4" W.G.

A filter area three times as large would naturally last three times as long before necessitating replacement. The necessity to enlarge the filter area without enlarging the overall face area of the filter assembly has led to the solution of folding the woven filter material into relatively small, closely spaced pleats. In order to prevent the pleats from collapsing one against the other the distance between pleats is secured by spacers as e.g strings or strips coated with an adhesive spanned across the entire filter.

Being faced with the problem to incorporate a pleated filter unit in a portable air cleaner leaves the designer with several options as how to incorporate an exchangeable filter unit of large through flow area and a blower unit in an attractive housing.

The most straight forward filter configuration would be that of a pleated HEPA-filter configured into a flat structure. The advantages are simple construction, but with the inherent drawback that the air cleaner unit becomes very large in its frontal dimensions, and that the design imposes serious restrictions on the manner in which air is drawn into the blower inlet or inlets.

A better approach to solving the problem of a small face area is described in U.S. Pat. No. 4,629,482 (G. B. Davis) which discloses a portable air purifier having a generally cylindrical air filter mounted to receive incoming air through its peripheral surface sucked in by a vertical single inlet blower and delivered to the outside through circumferential outlet openings. The design is advantageous in that it simplifies sealing of the filter in the cylindrical housing, but has a number of serious drawbacks, eg:—the design does not permit the use of a double-inlet blower which necessitates provision of a blower of larger diameter and consequently a larger housing. And the fact that the air outlets are near the floor prevents proper air circulation through the room.

The present invention has as its main object to accommodate a number of needs associated with the design of a portable air cleaner with high filtering efficiencies by incorporating a pleated HEPA-filter unit.

It is a further object to provide an air cleaner that is compact, effects a good air circulation through out the room and offers ready access to the filter for replacing it by the user.

It is another object of the invention to provide the air cleaner with a double-inlet blower with a view to reducing the inlet velocity into the blower and to obtaining higher blower efficiency.

It is a further object of the invention to provide for a compact air cleaner where the blower housing in partially located inside the filter structure.

It is another object of the invention to provide for perfect sealing between the filter structure and the air cleaner housing.

It is still another object of the invention to provide for simple effective sealing around the blower outlet by molding the blower housing out of a semi pliable material.

It is yet another object of the invention to provide for low cost means to sense and signal that a filter should be replaced.

Additional objects of the invention will become evident from the following figures and as the air cleaner is described in detail.

SUMMARY OF THE INVENTION

The air filtering apparatus according to the present invention includes essentially a front portion in the shape of a housing, a rear portion in the form of a filtering chamber and a blower unit partly enclosed by the housing and partly by the filtering chamber.

The blower is a double-inlet centrifugal blower having a horizontal axis and an air outlet extending through the frontal housing. The housing comprises a bottom portion, an envelope and a top portion, and is open towards the filtering chamber in the form of a rectangular opening surrounded by a flange. The blower outlet extends through the housing in airtight connection with all other portions of the housing likewise tightly sealed. The filtering chamber comprises a filter sheet which is folded into a plurality of pleats and is curved into arch-shape with the axis of the arch extending substantially parallel to the flange of the housing. The chamber is covered by a solid top and a solid bottom extending as far as the arch, leaving a rectangular opening surrounded by a flange which is coextensive with the flange on the housing. Means are provided for urging the filtering chamber onto the housing and for tightly connecting the two components by means of the two flanges, with a compressible closed cell foam frame serving as a gasket.

A preferred embodiment of the air filtering apparatus of the invention is in the shape of a vertical cylinder of circular, elliptical or similar cross section and includes a housing occupying about half the frontal portion of the cylinder, a filtering chamber occupying the rear half of the cylinder, and a centrifugal double-inlet blower partly enclosed by said housing and partly by said arch-shaped filtering chamber.

Referring now to the different components of the apparatus:—the housing comprises a base, an envelope surrounding approximately one half of the frontal circumference of the apparatus and a top portion provided with an opening sealingly connected to the outlet of the blower. The housing is tightly sealed all over and is open towards the rear in the form of a rectangle which is surrounded by a flange.

The blower includes a housing molded of a light-weight plastic material and is composed of two halves which are connected along the center line by tongue and groove to effect a leakage-proof seam. The two halves contain the right and left inlet openings, each being covered by a cage composed of respective vertical and horizontal ribs, whereof one cage contains the electric motor directly coupled to the blower impeller. The cages are rigidly connected to the upstanding portions of the housing base, thus securing the blower in position. The blower outlet is sealingly connected to the respective openings in the top cover of the housing which is covered by a removable grille preventing access to the rotating parts.

The filtering chamber comprises a filter unit in the form of a HEPA-media sheet folded into a plurality of small pleats and bent in arch-shape with the pleats of a length about equal to the height of the opening in the housing and extending parallel to the arch axis.

The blower includes a housing molded of a semi-pliable plastic material and is composed of two halves which are connected along the center line by tongue and groove to effect a leakage-proof seam. The two halves contain the right and left inlet openings, each being covered by a cage composed of respective vertical and horizontal ribs, whereof one cage contains the electric motor directly coupled to the blower impeller. The cages are rigidly connected to upstanding portions of the housing base, thus securing the blower in position. The blower outlet is sealingly connected to the respective opening in the top cover of the housing which is covered by a removable grille preventing access to the rotating components.

The filtering chamber comprises a filter unit in the form of a HEPA-media sheet folded into a plurality of small pleats and curved in arch-shape with the pleats of a length about equal to the height of the opening in the housing and extending parallel to the arch axis. The arch is preferably in the shape of a semi-cylinder of circular cross section, but parabolic, elliptical or any other rounded shape may be chosen, to suit the taste of the designer and the requirements of the total filter area. A solid bottom and a solid top sheets are firmly attached to the two ends of the arch, and form-together with the ends of the arch-shaped filter unit—a rectangular opening surrounded by a frame and a flange which are coextensive with the opening and the flange of the housing. The filtering chamber is urged upon the housing by a removable grille, with the two flanges pressed upon each other with a resilient gasket positioned there-between, to ensure air-tightness. The filtering chamber is attached to the housing with its axis vertically directed and with its bottom inserted into a recessed portion of the base. The circumference and the top of the filtering chamber are enclosed by a grille which surrounds the outside of the filter in close alignment. The inside contour of the grille corresponds to the outside contour of the filtering chamber and protects it against outside contact while holding it in position by a plurality of inwardly protruding lugs. The grille is provided with a closed top which is connected to the rear border of the housing top, while its vertical edges contact the vertical edges of the envelope.

Replacement of a used filtering chamber by a clean one is effected by removing the grille, tilting the chamber and pulling it out of contact with the housing.

As discussed before, after extended use of the filter a layer of pollutants will build up on the face of the HEPA-media, increasing the pressure drop and impeding the air flow through the filter. In order to alert the user that this has happened and that the filtering chamber has to be exchanged, a special flow meter is preferably mounted on the blower housing which will effect a warning light to be energized as soon as the difference between the air pressure inside and outside of the blower housing has reached a predesignated magnitude.

The apparatus is provided, in a conventional manner, with electric control means of the blower motor.

An ionizer unit is an optional feature to be mounted in special compartment of the housing base.

DETAILED DESCRIPTION OF THE DRAWINGS

Figure 1:
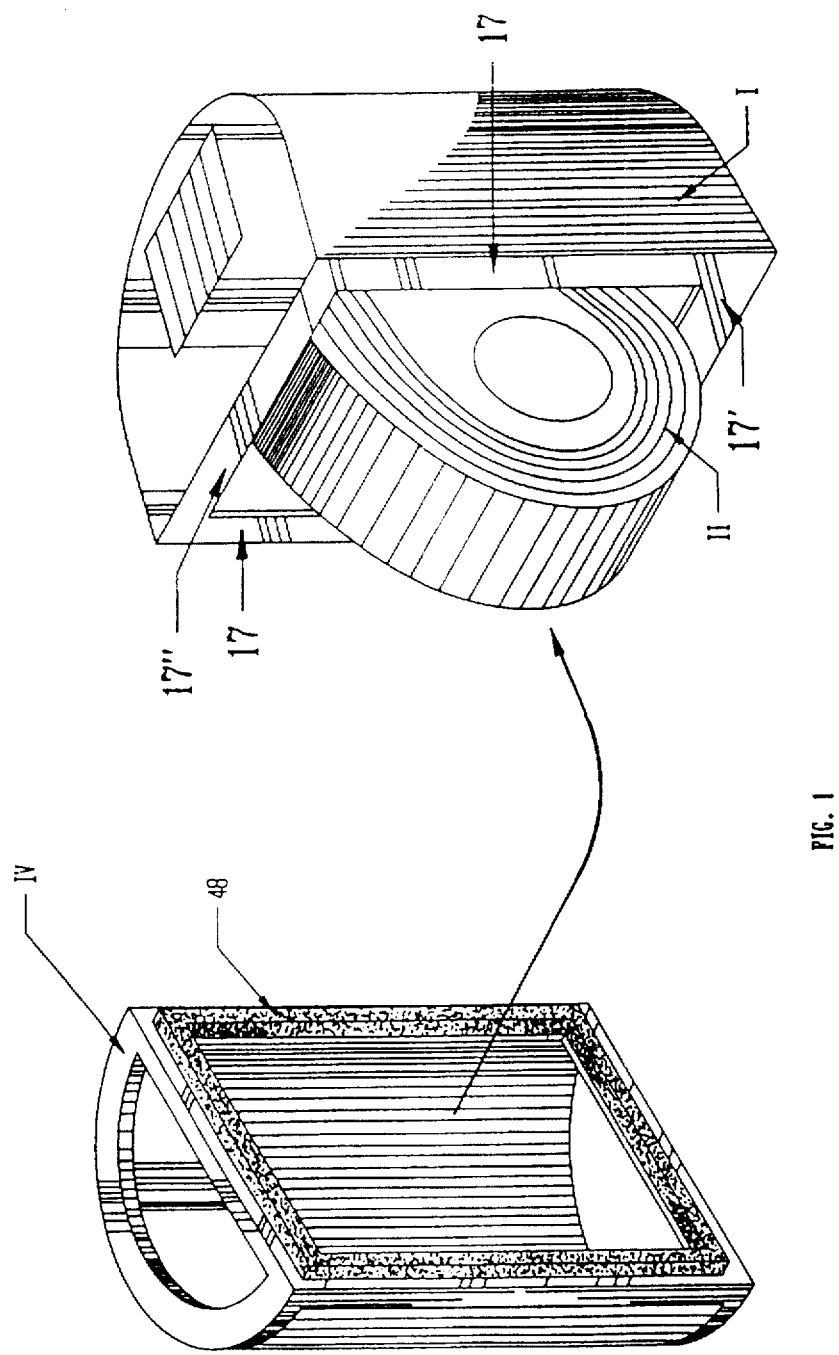
FIG. 1 is an isometric view of the air filtering apparatus with the filtering chamber separated from the housing.
Figure 2:
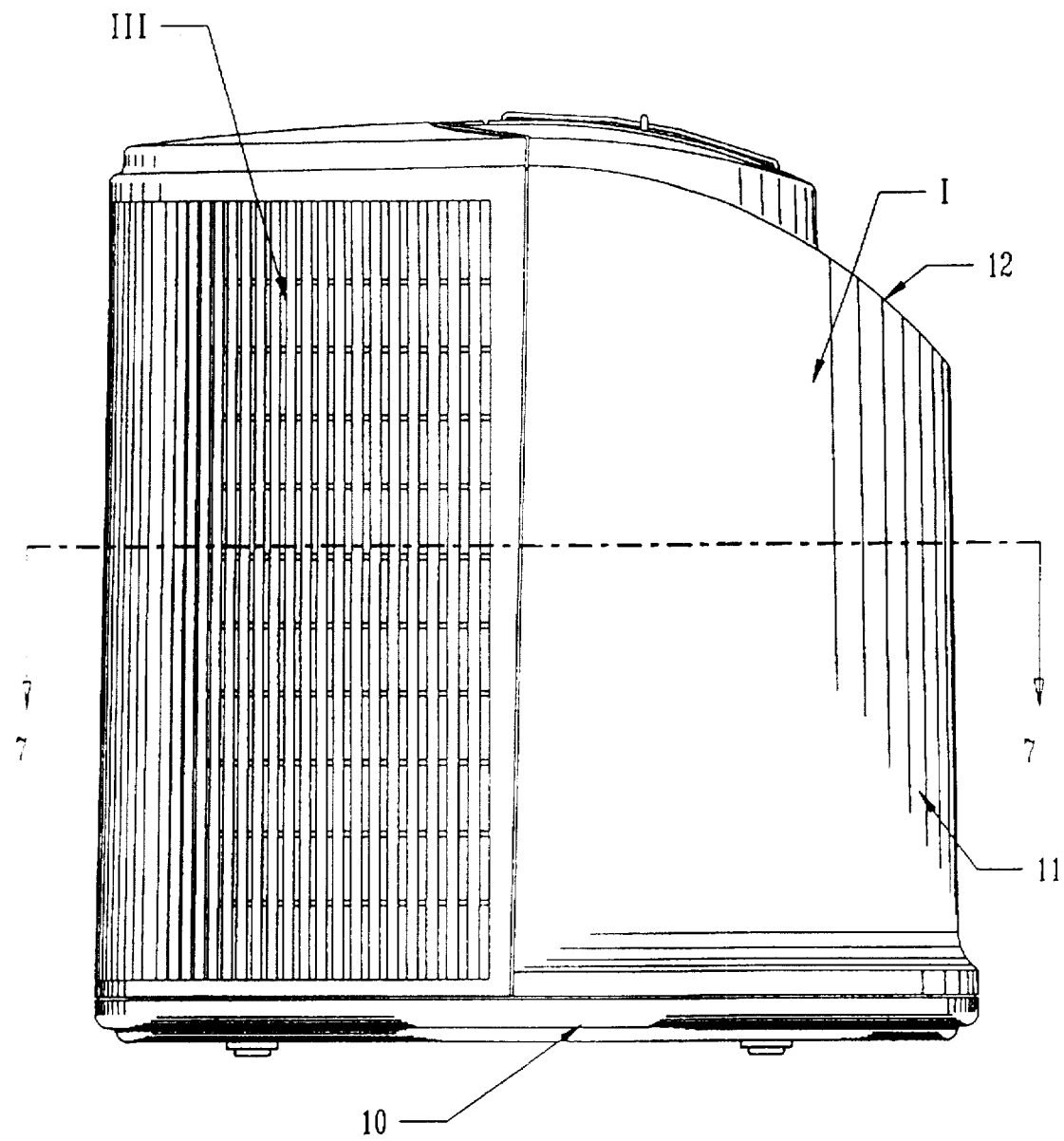
FIG. 2 is a side view of one embodiment of the apparatus.

FIG. 1 is a schematic drawing of an air filtering apparatus illustrating a blower unit II mounted in a housing I on the right of the drawing and a filtering chamber IV in the left. It also shows a gasket 48 attached to the flange of the filtering chamber, ensuring airtight connection between housing and filtering chamber.

Figure 6:
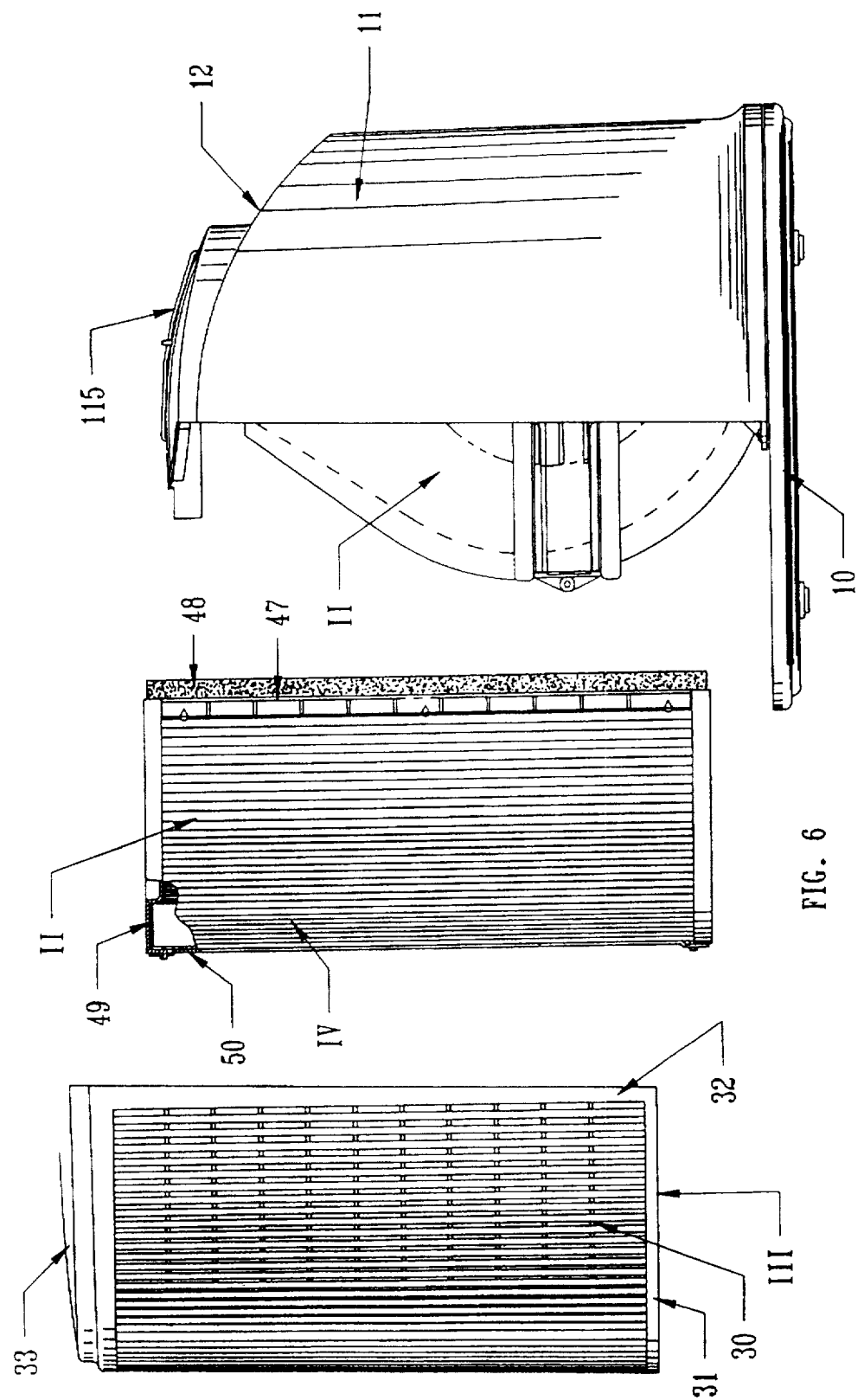
FIG. 6 is a side view of the apparatus of FIG. 2 with both the grille and the filtering chamber separated from the housing and blower unit.

Referring now to FIGS. 2, 3, 4 and 6, a preferred embodiment of the air filtering apparatus includes a housing I, a blower unit II, a grille III and a filtering chamber IV, which can be better viewed in the exploded view of the apparatus shown in FIG. 6.

Figure 7:
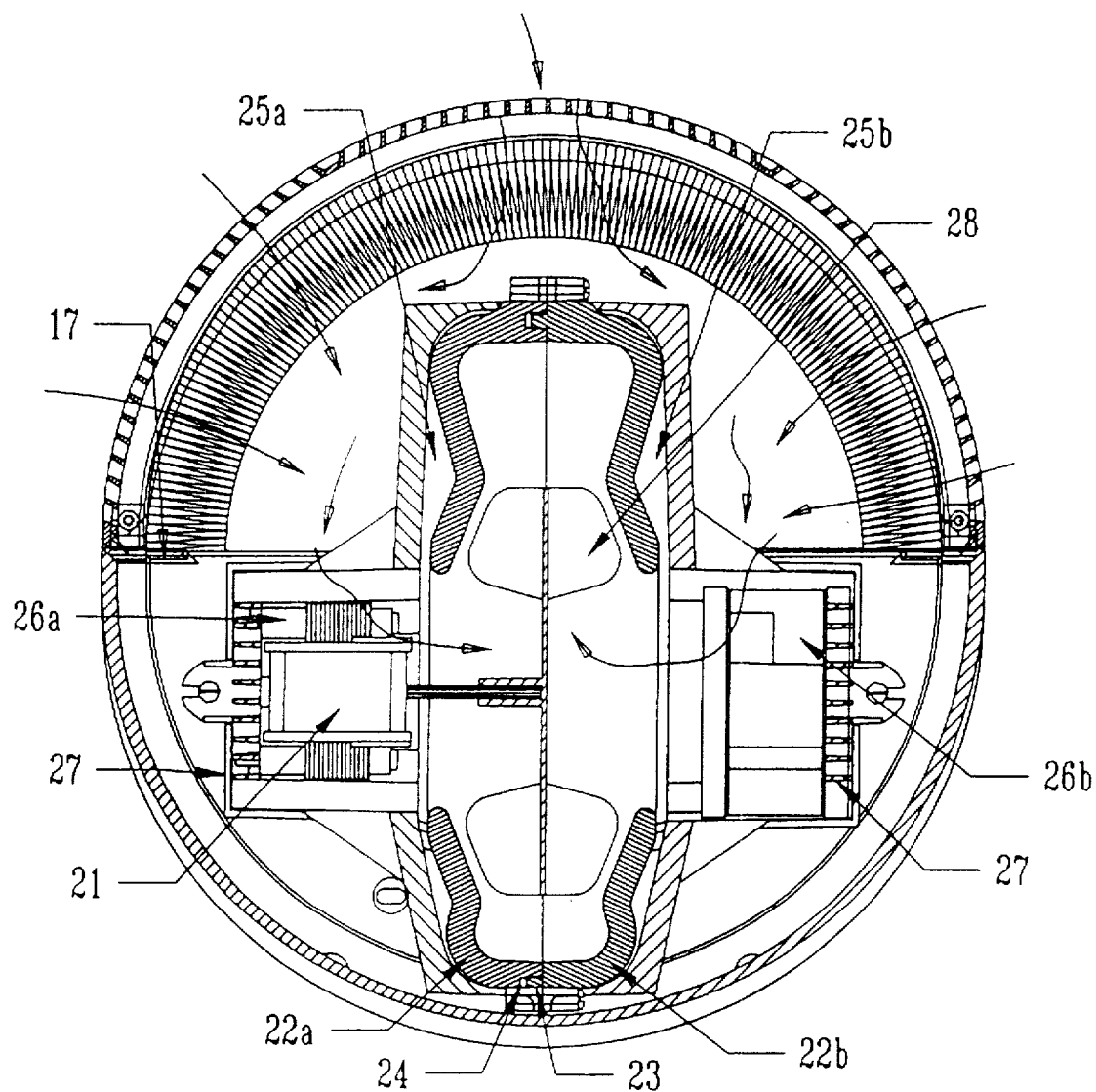
FIG. 7 is a cross sectional view of the apparatus along lines 7—7 of FIG. 2.
Figure 8:
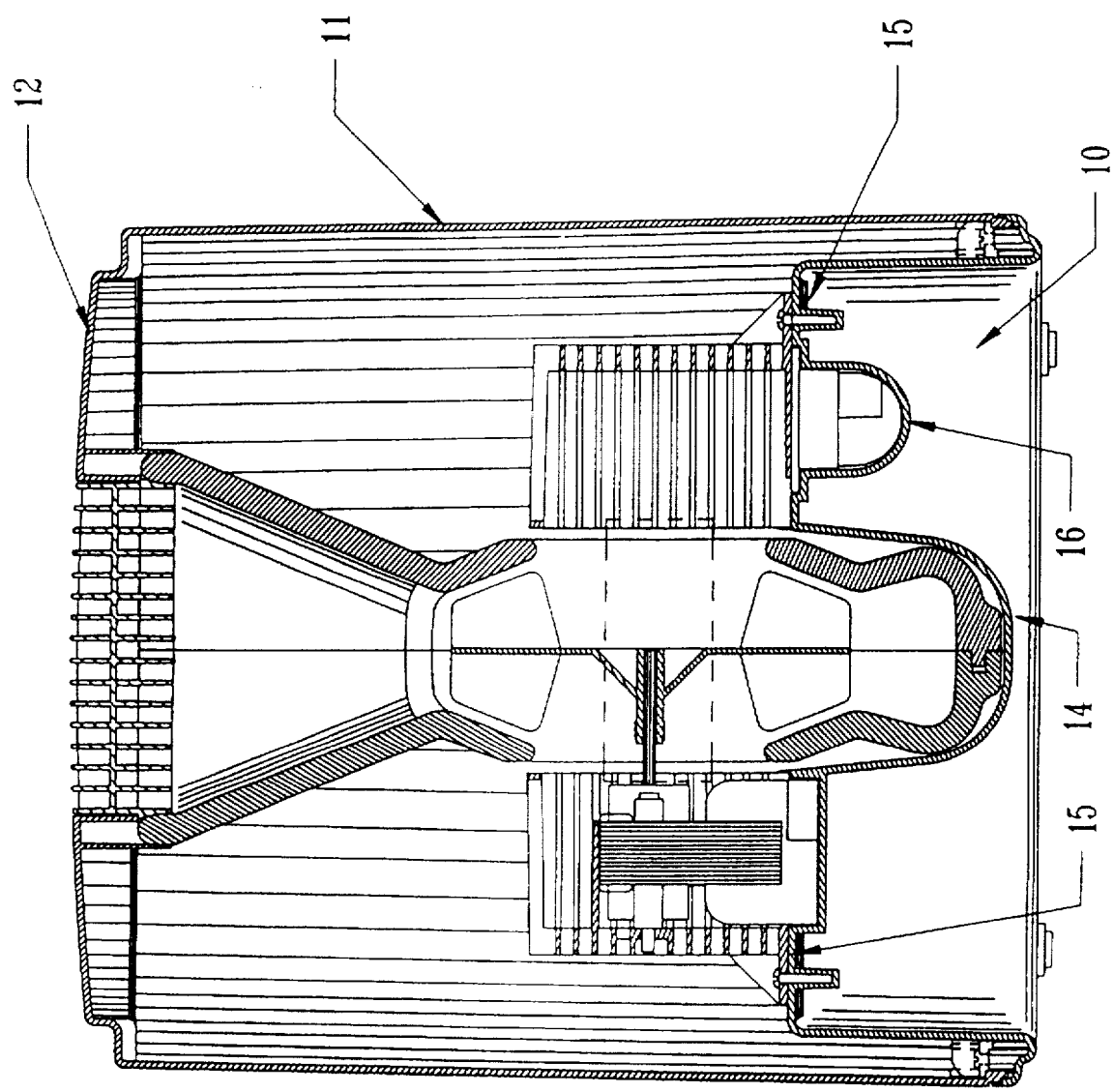
FIG. 8 is a section of the blower unit along lines 8—8 of FIG. 5.

Details of the above components are illustrated in FIGS. 5, 7, 8 and 9. The housing I is made of a rigid plastic material and includes a base 10, an envelope 11 and a top portion 12. FIG. 7 shows the base to be of circular shape, but it will be understood that an oval, elliptical or other oblong rounded shape will be suitable in order to accommodate the blower of the required filter area. The rear portion of the base is flat and forms a recess 13 (FIG. 5) for accommodation of the filtering chamber, while the front portion is raised and forms a central portion 14 of a shape surrounding part of the blower housing and two flat side portions 15 designed to support the blower unit. A pocket 16 is optional and may serve as a chamber unit for an ionizer unit. The housing is open towards the rear and forms a rectangular flange 17 abutting on the flange of the filtering chamber IV with a gasket 48 placed in between.

The envelope 11 has a bottom edge 110 firmly connected to the front portion of the base and constitutes an integral unit with the top portion 12. It occupies about one half of the entire circumference and is provided with the above mentioned flange 17 along its vertical edges, which is continued at its bottom end by the front edge 17' of the recess 13 and at its top 17" in continuation of the top portion 12. The top portion 12 (FIG. 2 & 3)is vaulted and terminates in a curved rear edge 112 which carries a button 113 serving as a connector of the housing with the grille III. The top portion is provided with a substantially square opening 114 which encloses the blower outlet in air sealed connection and is covered by an outlet grille 115. A second opening in the top portion is covered by a removable cover 116 which contains the control elements of the apparatus, such as switches and indicator lights.

Figure 3:
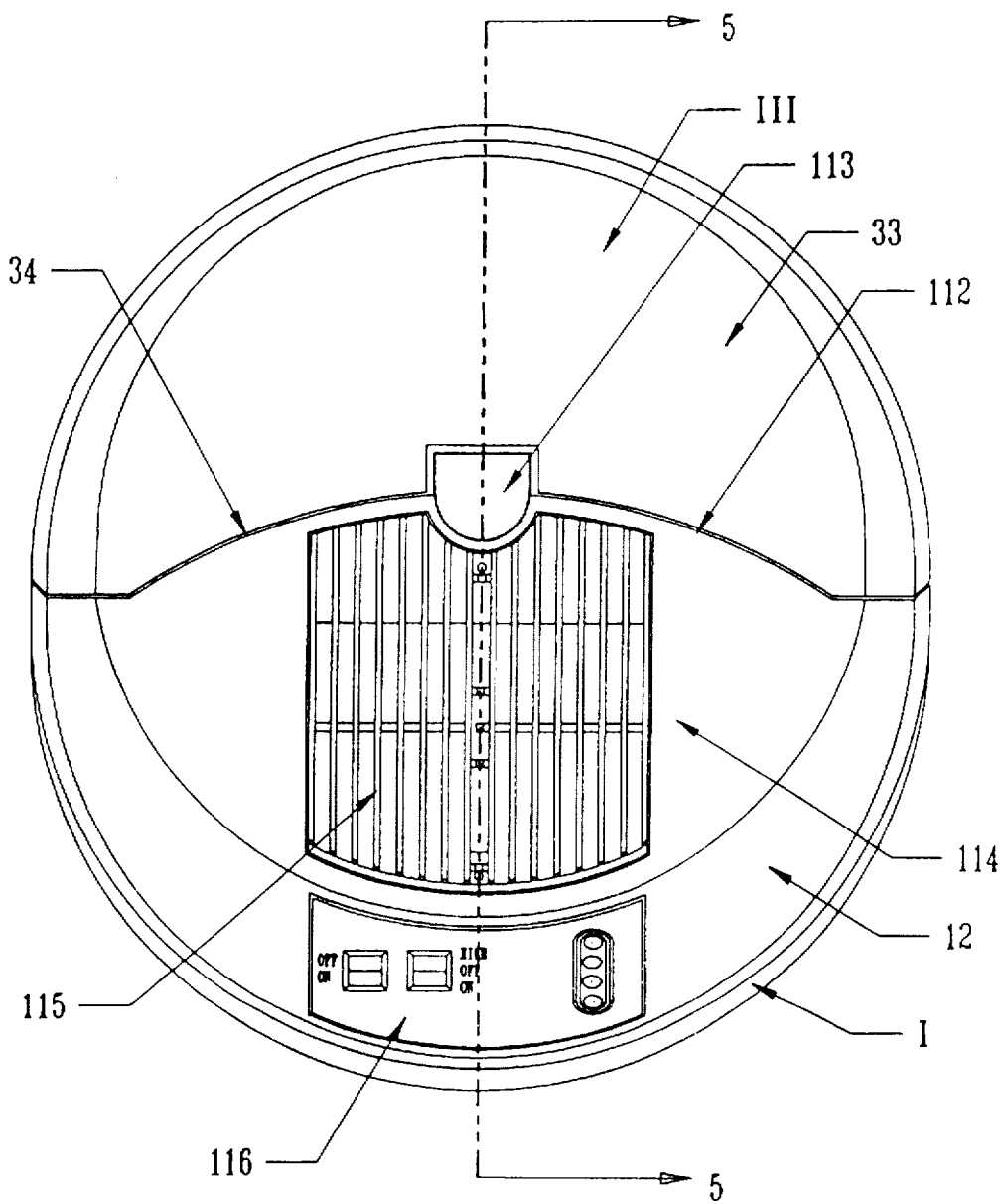
FIG. 3 is a top view of the apparatus of FIG. 1.
Figure 4:
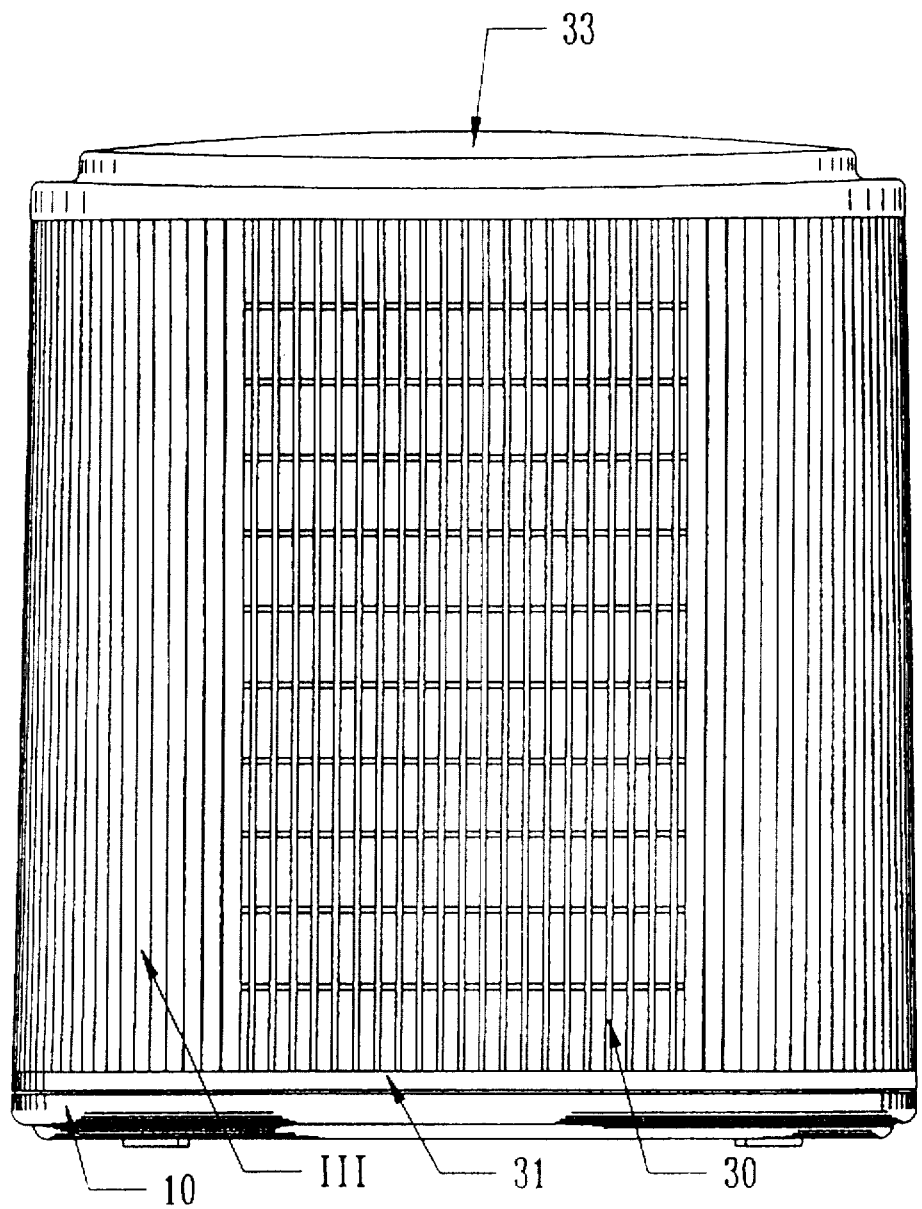
FIG. 4 is a rear view of the apparatus of FIG. 1.

The grille III is best visible in FIG. 4 and 6. It comprises mainly a network 30 of vertical and horizontal ribs bent to the curvature of the base and surrounded along the bottom edge and along the vertical edges by solid frames 31 and 32 respectively. The grille is provided with a top cover 33 the shape of which can be best viewed in FIG. 3, showing that its front border 34 corresponds to the rear border 112 of the housing top 12. The grille can be released from connection with the housing by pressure on button 113 permitting removal of the grille for replacement of the filter unit, by the user. By slightly tilting and lifting the grille out of channel 17 of the base the grille can be completely removed for exchange of the filter unit.

The blower is illustrated in all details in FIGS. 5, 7, 8, 9 and 10, likewise showing its firm positioning inside the housing.

The blower unit II is constructed out of two essentially mirror-imaged halves 22a & 22b. It is molded out of expended polystyrene beads into a light weight semi-pliable structure. The two blower housing halves 22a & 22b are made to intermesh at their joint surfaces by a tongue 23 and groove 24 detail which provides a leakage-proof seam. In order to hold the two housings halves firmly together two rigid frames, or braces 25a & 25b are provided which are screwed to each other at their extremities and actually cause the tongue and grove detail to compress to enhance the tightness of the seam. Each of the rigid frames are provided with a cage shaped center portions 26a & 26b which project away from the blower housing and which cover the two air inlet openings of the blower housing. Both cages including horizontal and vertical ribs which form a multitude of openings 27, large enough to permit air flow, yet small enough to prevent physical access to the blower wheel 28 or the electric motor 21, which is located in one of the enclosures.

The uniqueness of this design is as follows; The frames 25a and 25b with their enclosures 26a & 26b provide the force needed to seal the blower housing halves to each other, they provide rigid anchorage points to the rest of the structure, they safely enclose the motor and prevent contact with the blower wheel 28 which would otherwise be exposed to the outside after the filter IV has been removed. Finally, the frames provide the alignment between motor and blower housing which is critical in order to optimize blower performance and sound.

Figure 5:
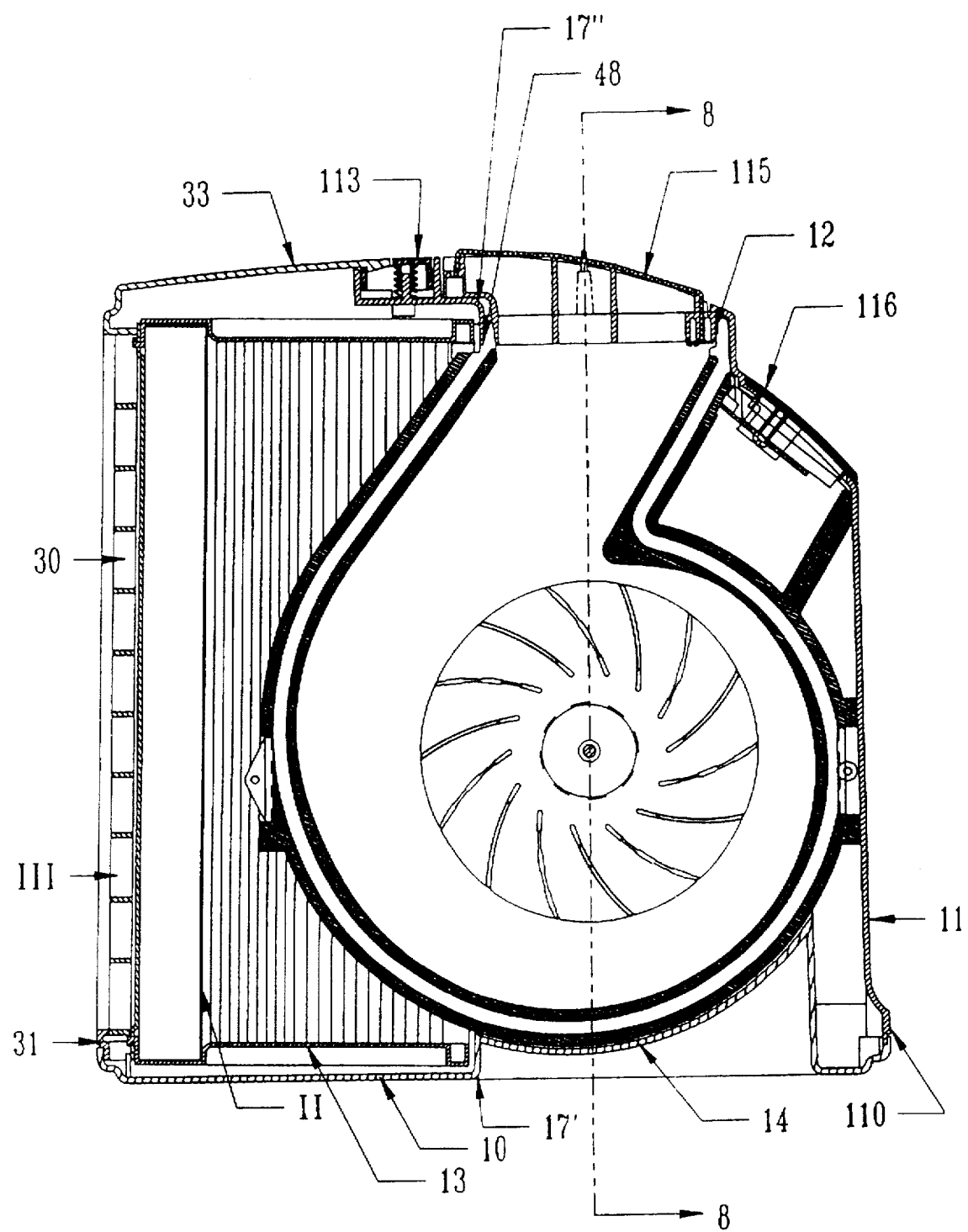
FIG. 5 is a cross sectional view of the apparatus along line 5—5 of FIG. 3.
Figure 9:
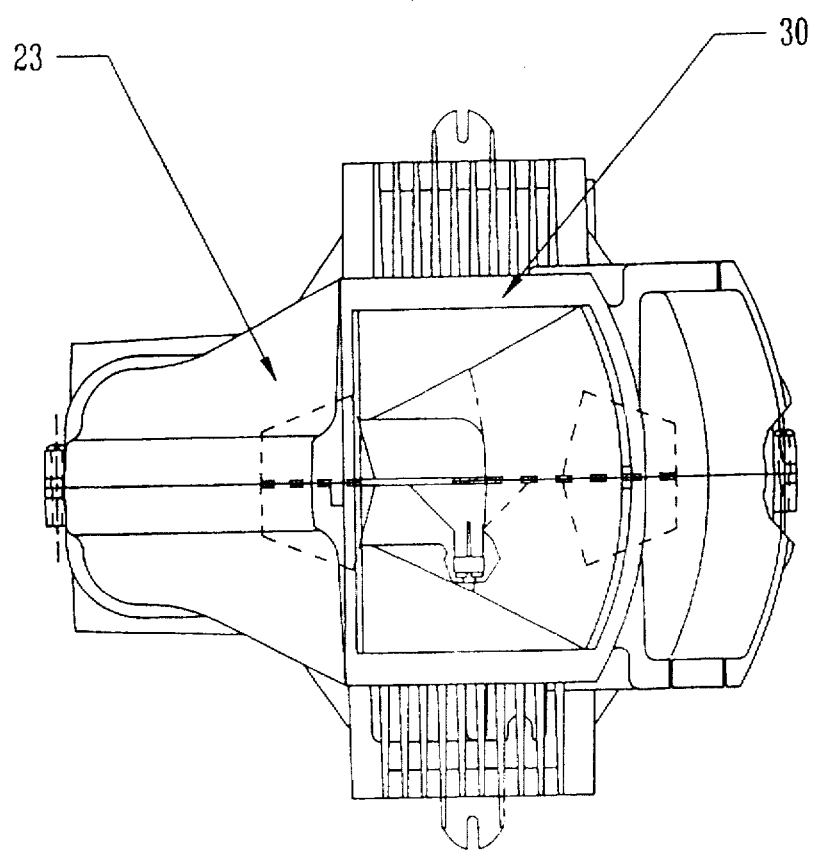
FIG. 9 is a top view of the blower unit.
Figure 10:
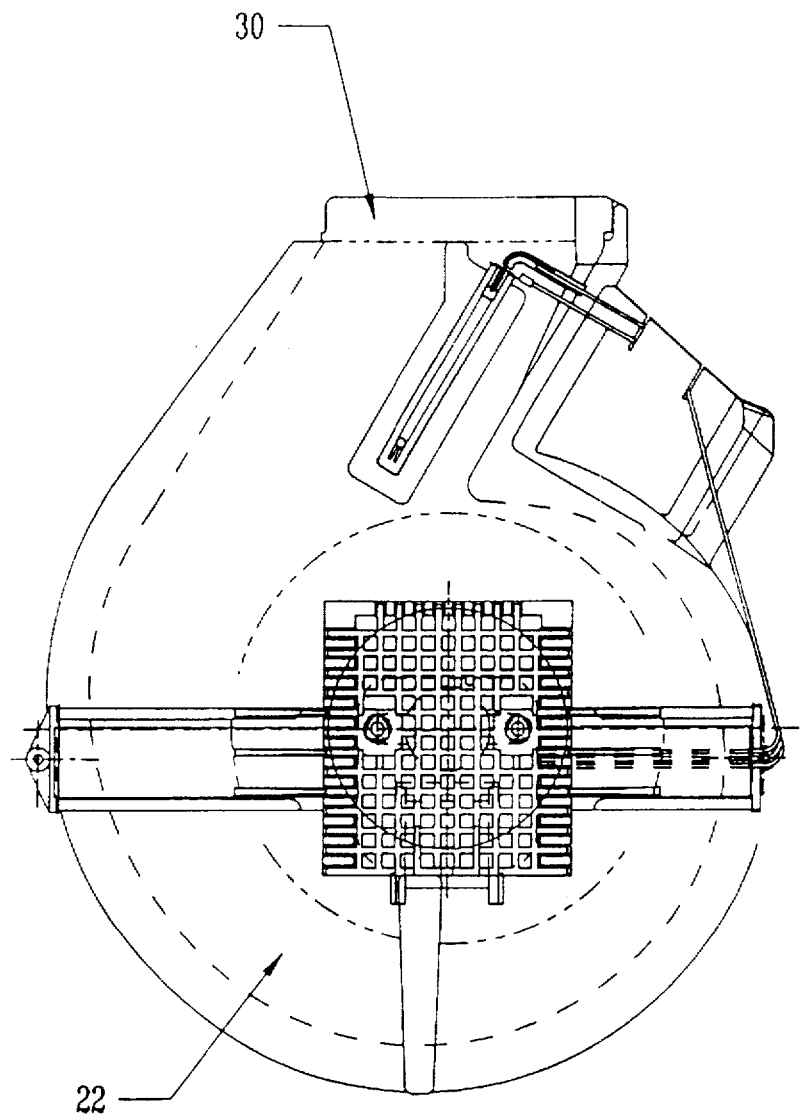
FIG. 10 is a side view of the blower unit.
Figure 11:
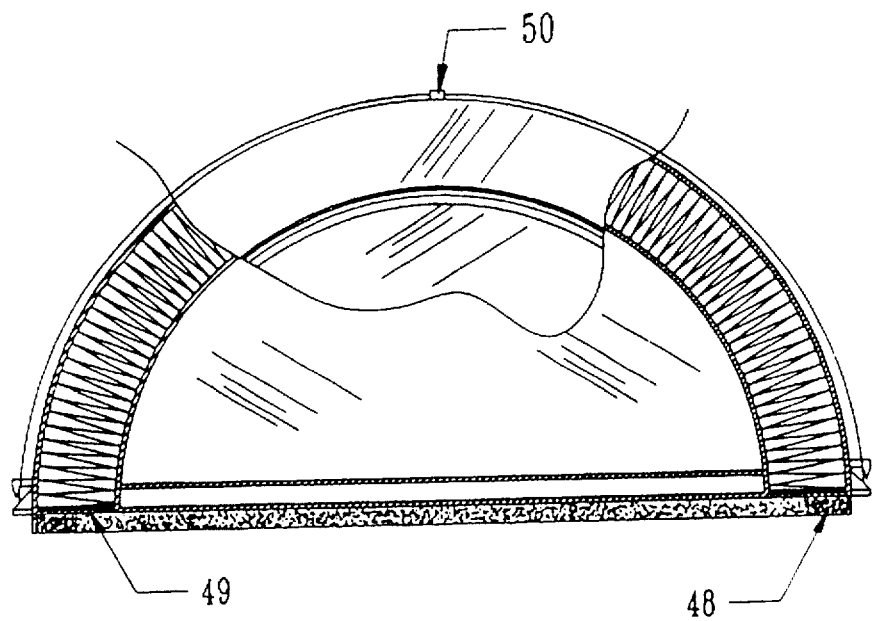
FIG. 11 is a partial top view and a partial cross section of the filtering chamber.
Figure 13:
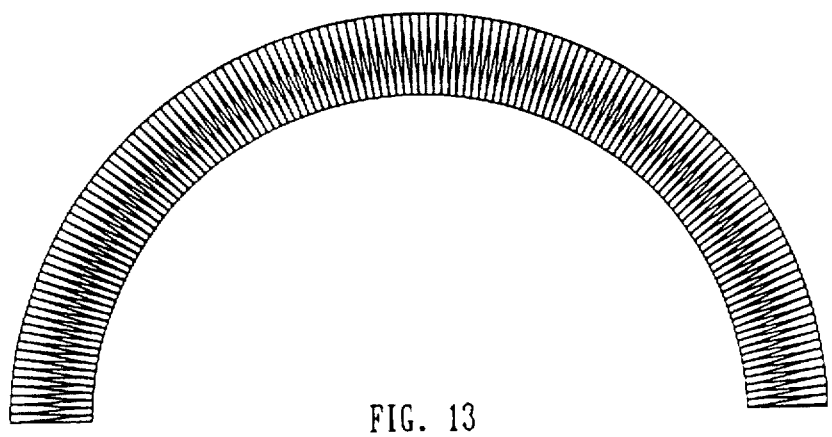
FIG. 13 is a top view of the filtering unit of FIG. 12, bent into semi-cylindrical shape.
Figure 12:
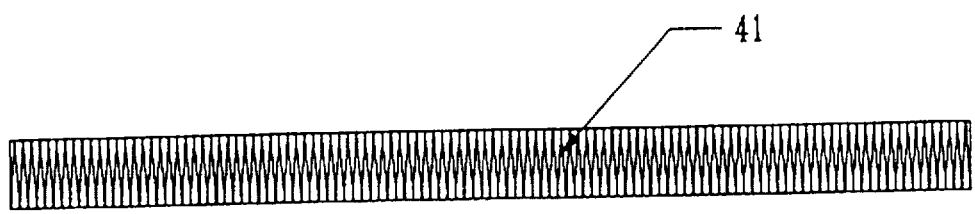
FIG. 12 is a top view of the pleated filter unit in its flat condition.
Figure 14:
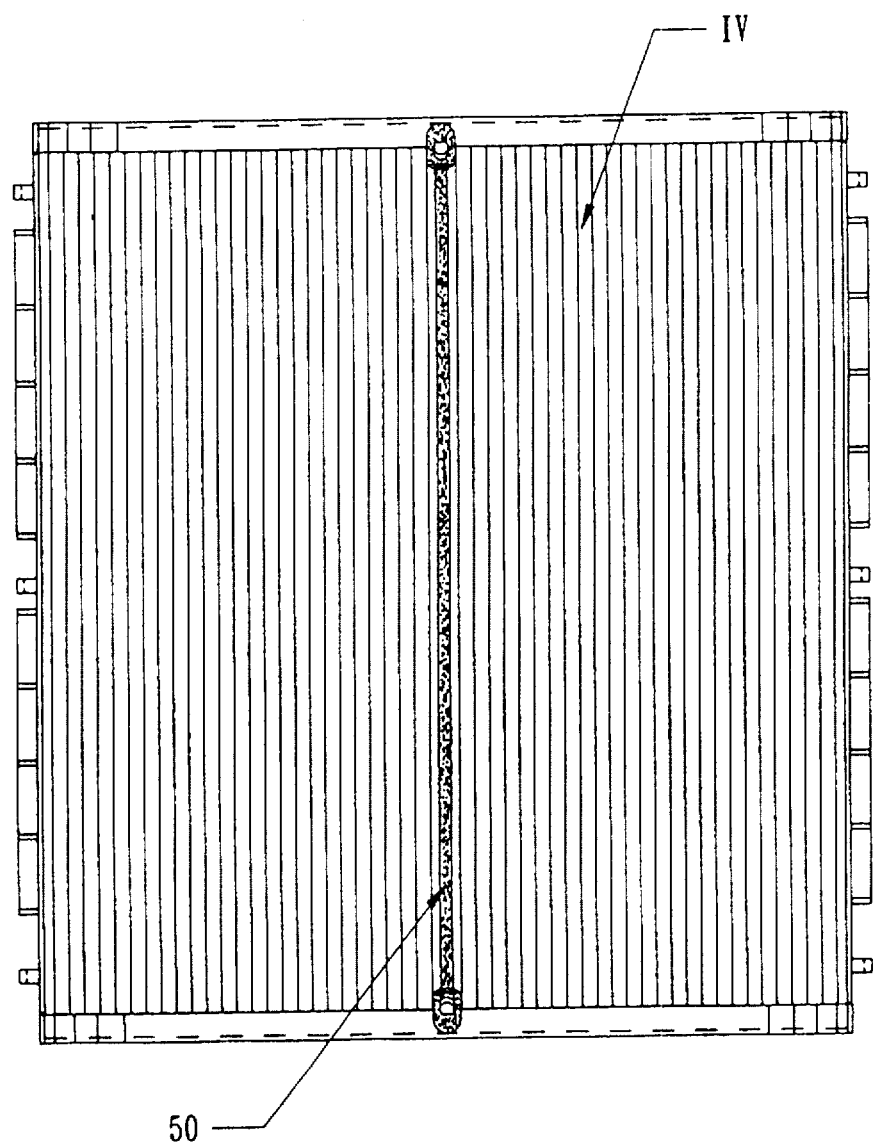
FIG. 14 is a rear view of the filtering chamber.
Figure 15:
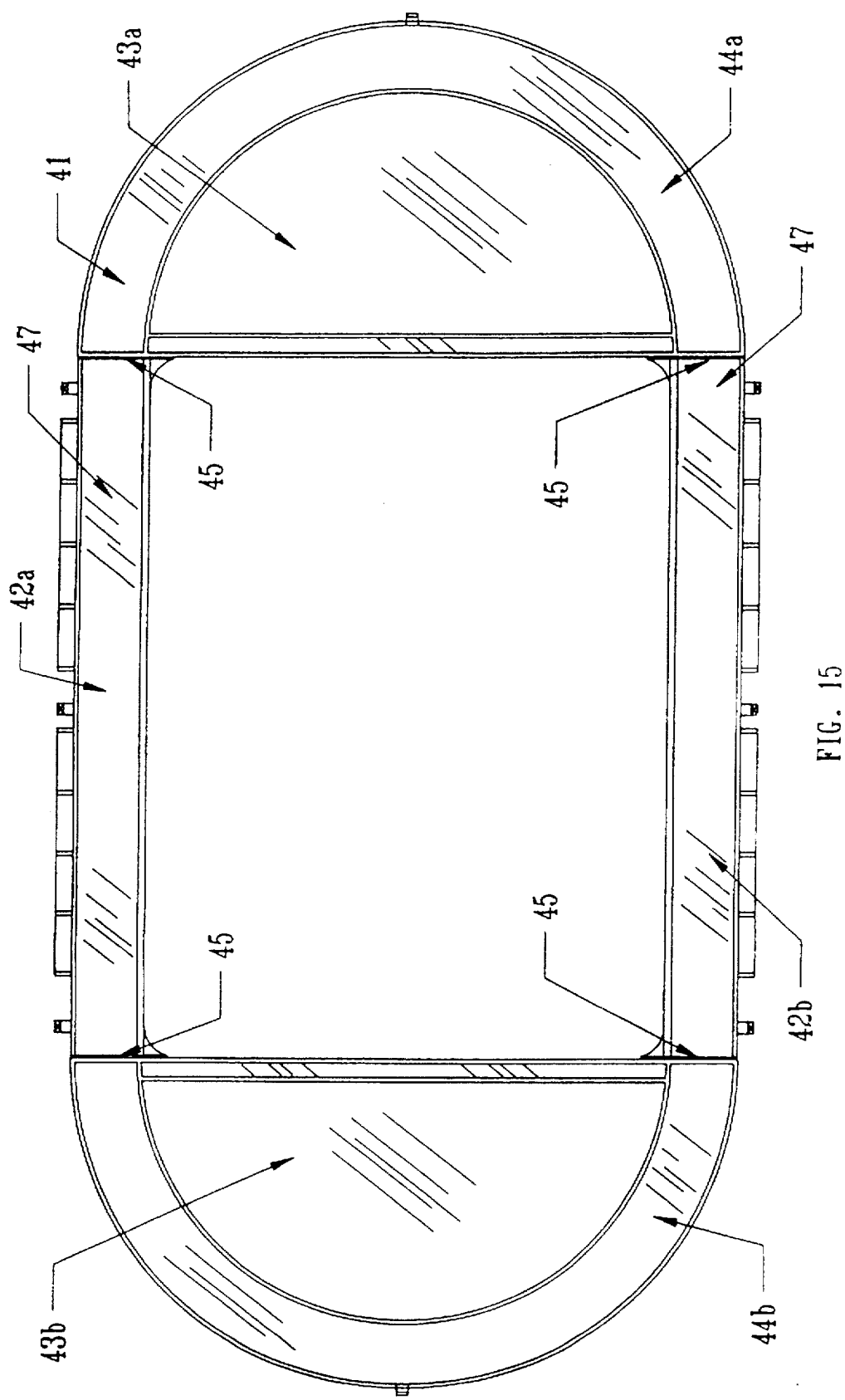
FIG. 15, is a view of the frame surrounding the filter unit in flat condition.

FIG. 9 shows the top view of the blower housing with its outlet 29, surrounded by a flange 30. In the assembly of the blower housing into the air cleaner unit the flange 30 is tightly squeezed between a frame 12 that is part of the main housing and is shown in FIG. 5 and the outlet grille outer frame, thereby compressing the blower outlet frame and creating a perfect air tight seal.

To provide for an air tight seal between the blower housing air outlet and interior of the unit (which acts as a low pressure plenum) the semi pliable foam housing is trapped in a molded frame that surrounds the air outlet of the unit, thereby eliminating the need for a special seal or gasket which would have been required had the blower housing been molded of a rigid plastic.

Referring now to FIG. 11–15 which describe the filter element and its support structure.

The filter proper consists of a pleated glass fibre media in which the pleats are spaced apart by means known in the art: For example by a series of beads of hardened glue (not shown). The glue is dispensed and adheres to the surface of the media before it is pleated, during the pleating operation the glue sticks to itself, forming a series of rigid barriers that prevent the pleats from collapsing against each other.

While in some instances it is preferred to have the spacers placed on both sides of the pleated media, for extra support. In the present embodiment it is preferable to have the beads applied only to the "down-stream" side of the media, as would be discussed henceforth.

In order to utilize the pleated filter media as an effective filter it needs to be put into a frame and tightly sealed to that frame to avoid any air bypass or leakage.

It was determined that a filter shaped as a semi circular cylinder, for example, would be most efficient in terms of space utilization, the rigidity of its structure and the ability of the air to be sucked uniformly by the blower is much enhanced by that structure: A double inlet blower housings can be located within the confines of the semi cylindrical filter structure as shown in FIG. 7 with little obstruction to the air entering the blower housings inlets.

In order to construct the filter in it's final semi circular cylindrical form the following steps must be followed:

A filter-support-frame is molded as a flat frame with two elongated parallel channels 42a & 42b and two solid semi-circular panels 43a & 43b each provided at their peripheral extremity with a channel 44a & 44b similar in cross section to the two side channels 42a & 42b and which connects with the elongated channels to form a continuous channel. The semi circular panels are connected to the parallel channel ends by what is known in the art as a "living-hinge" 45 namely a very thin webbing connects the two parts which allows the panels to be hinged at will in relation to the channels.

The filter-support-frame is placed on the assembly table in its flat condition with the open channels facing up. A fast drying glue, commercially referred to "hot-melt" is dispensed into the continuous channel so that it forms a layer 49 approximately ⅛" (3 mm) high. The flat pleated filter is now curved in a semi cylindrical shape and its two elongated extremities are placed in the elongated channels. The two semicircular panels 43a & 43b are now hinged upwards so that they end up at a right angle to the elongated channels and their semicircular channels trap the two open ends of the filter media. The two semi circular panels are held in their position by a strap 50 of a predetermined length which bridges the two panels. The glue is now allowed to solidify so that it forms an uninterrupted seal 49 around the entire extremity of the filter media.

It might be added that while both the filter media and the frame while in their flat condition are very flimsy and exhibit no structural strength. The final semicircular structure becomes very rigid and stable. This fact is very significant since the final filter structure has to seal well against the air cleaner housing flange, and only a rigid structure could be relied on to support the sealing gasket 48.

It was previously discussed that after a prolonged use the effectiveness of the filter media begins to diminish. This is caused by a build-up of contaminants on the up stream face of the media and throughout the media thickness. The presence of the contaminants reduces the available openings for the air to flow through and thus decreasing the amount of air that can flow through the media, and increasing the pressure drop through the media. At a certain point the amount of air that can still pass is so reduced that the filter needs to be replaced. It is important to convey to the user that the filter should be replaced. The pressure drop differential between a clean filter and a filter that needs to be replaced is only in the range of (0.4–0.7") W.G. (10–20 mm) W.G. A pressure switch that would be sensitive enough to accurately sense this difference would be expensive and large. It was thus determined that to use a tapered bore flow meter with a metal float would be an accurate and a low cost means of indication.

Figure 17:
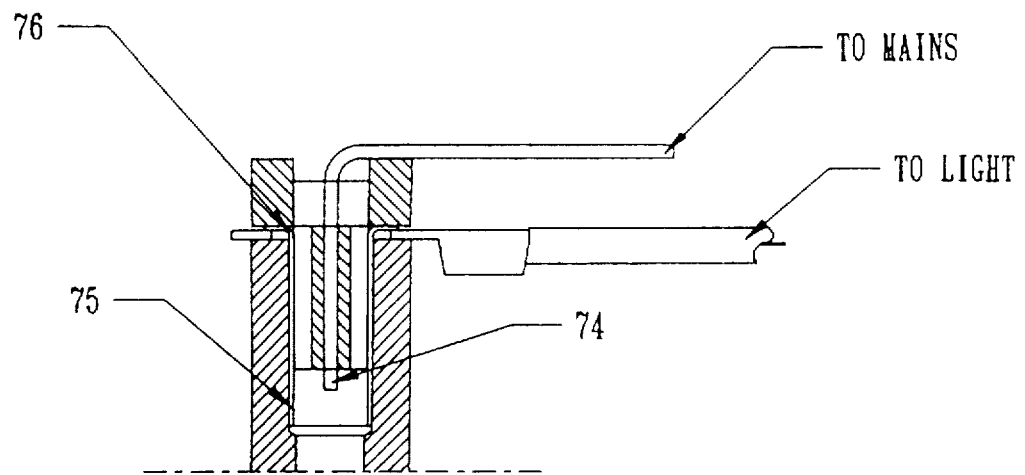
FIG. 17 is an enlarged view of the top portion of the sensor and pressure indicator of FIG. 16.
Figure 16:
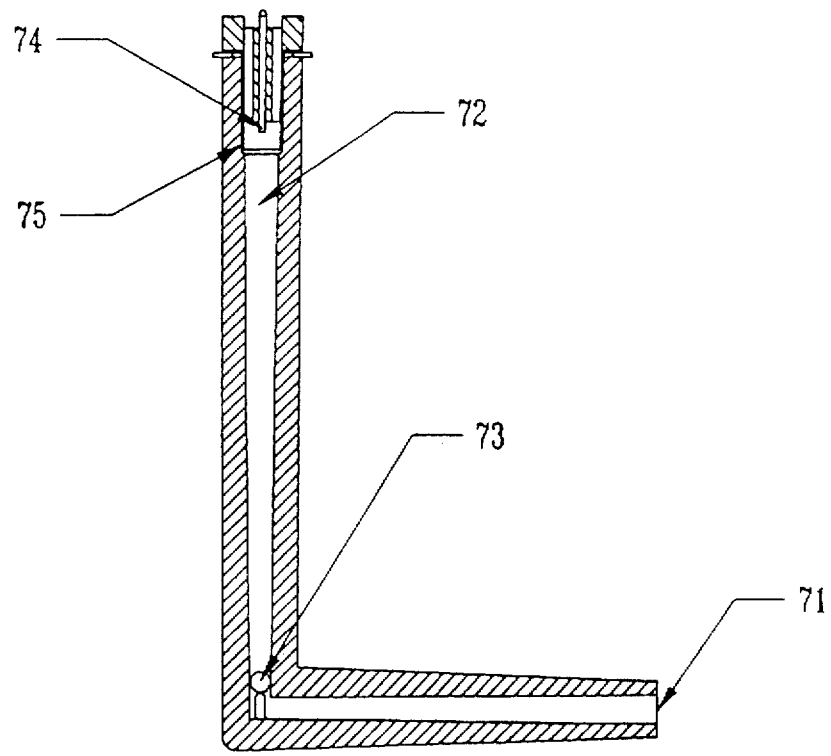
FIG. 16 is a side view of a pressure sensor and indicator.

The filter replacement indicator according to the invention is constructed and operates as follows:

FIGS. 16 & 17 show a tapered bore flow meter VIII which is positioned outside the blower housing so that it's lower opening 71 communicates with the interior of the blower housing and it's upper opening 72 communicates with the plenum surrounding the blower. Thus the suction head that the blower generates (which is equal to the pressure drop through the filter) will be proportional to the flow through the flow meter. The ball 73 in the flow meter tube will rise proportionally to the flow through the flow-meter which is also proportional to the pressure drop through the filter.

When the pressure drop through the filter reaches a level at which the filter should be replaced, the ball in the flow meter would reach the top of the tapered tube. When the ball (which is made of brass, or plastic coated with a conductive coating) 23 reaches the top of the tube it contacts the pin 74 which stops it from rising any further; at that position the ball simultaneously contacts the tubular portion 75 of the eyelet 76 and the pin 74. By doing so the brass ball closes an electric circuit which causes the indicator light to turn on indicating the filter needs to be replaced.

I claim:

1. A filter assembly for use in a room air filtering system having a blower partially disposed within an interior chamber of a housing, said filter assembly defining an interior chamber and being positionable with the housing such that the interior chambers are in fluid communication to thereby define an interior compartment, said filter assembly comprising:

a pleated filter sheet foldable into an arcuately bent configuration;

a first semicircular panel defining a gasket receiving edge and a first peripheral channel dimensioned and arranged to receive a first edge of the pleated filter sheet in said arcuately bent configuration;

second semicircular panel defining a gasket receiving edge and a second peripheral channel dimensioned and arranged to receive a second edge of the pleated filter sheet opposite the first edge;

a first elongated member interconnecting said semicircular panels and defining a gasket receiving edge and a third channel in communication with a first end of each of said first and second peripheral channels;

a second elongated member arranged parallel to said first elongated member and interconnecting said semicircular panels, said second elongated member defining a gasket receiving edge and a fourth channel in communication with a second end of each of said first and second peripheral channels, wherein the pleated filter is positionable within said filter frame such that each edge thereof is seated within one of said channels and a gasket mounted on said gasket receiving edges of said first semicircular panel, said second semicircular panel, said first elongated member and said second elongated member so that said gasket provides sealing engagement between said housing and filter assembly.

2. The filter assembly of claim 1, wherein said first and second elongated members are hingedly connected to said semicircular panels such that said filter frame is manipulable between a first position, in which said semicircular panels and said elongated members are substantially coplanar, and a second position, in which said semicircular panels are disposed in parallel planes.

3. The filter assembly of claim 1, wherein said pleated filter sheet is fabricated from a glass fiber media.

4. The filter assembly of claim 1, wherein said pleated filter sheet is secured to said first and second semicircular panels by a glue.

5. The filter assembly of claim 4, wherein said pleated filter sheet is secured to said first and second elongate members by a glue.

6. The filter assembly of claim 1, wherein said first and second semicircular panels are connected to each other by a strap.

7. The filter assembly of claim 1, wherein said gasket is rectangular.

* * * * *